United States Patent [19]

Haesters

[11] Patent Number: 5,259,660
[45] Date of Patent: Nov. 9, 1993

[54] HOLLOW BEAM WITH COMPONENT MOUNTING ARRANGEMENTS

[75] Inventor: Achim Haesters, Ostring, Fed. Rep. of Germany

[73] Assignee: Ford Motor Company, Dearborn, Mich.

[21] Appl. No.: 929,079

[22] Filed: Aug. 12, 1992

[30] Foreign Application Priority Data

Aug. 22, 1991 [DE] Fed. Rep. of Germany ....... 4127729

[51] Int. Cl.$^5$ .............................................. B62D 23/00
[52] U.S. Cl. ..................................... 296/195; 296/205
[58] Field of Search .................. 296/195, 194, 29, 205

[56] References Cited

U.S. PATENT DOCUMENTS

| | | | |
|---|---|---|---|
| 2,177,896 | 10/1939 | Lee | 296/205 |
| 4,557,519 | 12/1985 | Matsuura | 296/29 X |
| 4,582,156 | 4/1986 | Kochy et al. | 296/194 X |
| 4,597,461 | 7/1986 | Kochy et al. | 296/194 X |

FOREIGN PATENT DOCUMENTS

| | | |
|---|---|---|
| 2049214 | 11/1975 | Fed. Rep. of Germany . |
| 2412506 | 3/1977 | Fed. Rep. of Germany . |
| 2227560 | 5/1984 | Fed. Rep. of Germany . |

*Primary Examiner*—Joseph D. Pape
*Attorney, Agent, or Firm*—Daniel M. Stock; Roger L. May

[57] ABSTRACT

A hollow beam 2 includes provisions (12, 13, 14 and 15) to allow mounting a spacer sleeve or support body 6 in its intended location for insertion of a mounting bolt 5 from outside the beam 2. The sleeve (6) at least partially encompasses the mounting bolt 5 and is inserted through an access opening (11) into the hollow beam 2 and is subsequently positioned in registration with attachment holes and which recive the mounting bolt 5.

4 Claims, 2 Drawing Sheets

HOLLOW BEAM WITH COMPONENT MOUNTING ARRANGEMENTS

FIELD OF THE INVENTION

The invention relates to closed hollow beams for motor vehicle bodies configured to define the mounting point of an other vehicle component.

BACKGROUND OF THE INVENTION

Various configurations of hollow beams suitable for mounting other vehicle components are known in the art. DE-PS 20 49 214, for example, shows a beam having holes for receiving mounting bolts surrounded by spacers carried within the beam.

However, the spacers are configured as welded tubes, which inconveniently must be first placed in the hollow beam prior to its closure.

It is also known from patent DE-PS 22 27 560, that a hollow beam for a motor vehicle body which is similar to the foregoing can be provided in which the spacers are designed as shaped stiffening plates, which must also first be placed inside the hollow beam.

However, mounting points for certain components often must be provided in hollow beams for motor vehicle bodies, which are assembled only as and when required, being actually mounted only on certain vehicles requiring an equipment content including the particular component. Such components generally include parts belonging to special equipment assemblies such as power steering, air conditioners or trailer towing packages. The necessity of preassembling the spacers in the prior art beam component mounting arrangements results in unnecessary use of parts for vehicles not demanding certain components.

SUMMARY OF THE INVENTION

Responsive to the disadvantages of the prior art, the objective of the invention is to optimize a closed hollow cam for a motor vehicle body in such a way that the installation of reinforcement parts necessary for a specific component inside the beam subsequent to its closure is made possible.

The present invention also responds to the deficiency of the prior art in that attention is paid to the optimum distribution of the loads to be absorbed.

According to one feature of the present invention an access opening is provided on the beam adjacent to the mounting holes, through which the spacer may be subsequently inserted into the beam. Further, there are mounting means inside the beam to allow the mounting of the spacer. Accordingly, the spacers may be introduced and secured only when a specific component must be mounted on a vehicle.

According to another feature, notches, reinforcement beads or similar are arranged at the side walls extending from the access opening, which form lateral, slanted ramps, by means of which a spacer sleeve can be rolled into and attached to its predetermined position concentric to the holes receiving the fasteners. This allows optimization of the load distribution to be absorbed, directing the load to the side walls of the hollow beam when the size of the access hole is kept as small as possible.

BRIEF DESCRIPTION OF THE DRAWINGS

The invention will be described in greater detail using drawings of an implementation example. It shows.

DETAILED DESCRIPTION OF THE PREFERRED EMBODIMENTS

The figures show a hollow beam 2 having side walls 7 and 8 for a motor vehicle body such as may be positioned to extend longitudinally in the rear of the vehicle, next to the wheel well for the spare tire.

Under the floor pan, the hat-shaped hollow beam 2 is fixedly secured along its edges with floor pan base plate 1 by means of spot welds 3. After welding the interior of the hollow beam is no longer laterally externally accessible.

Figure 1:
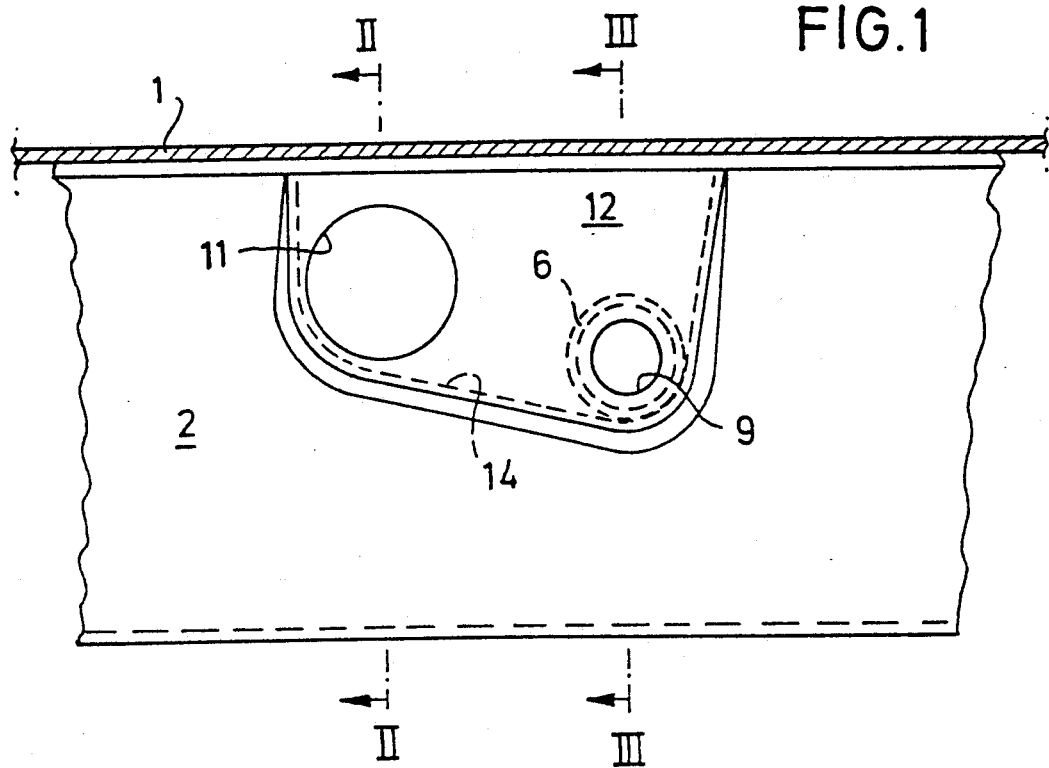
FIG. 1—a lateral view of a hollow beam of a motor vehicle body at the mounting point of a component.
Figure 2:
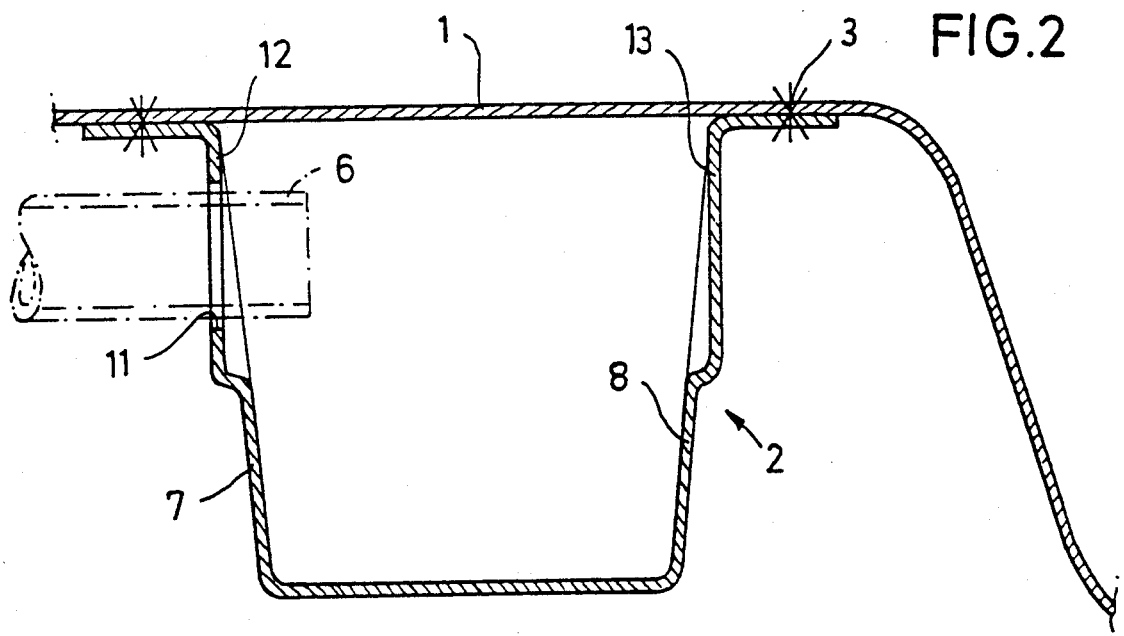
FIG. 2—a vertical cross section along line II—II of FIG. 1.
Figure 3:
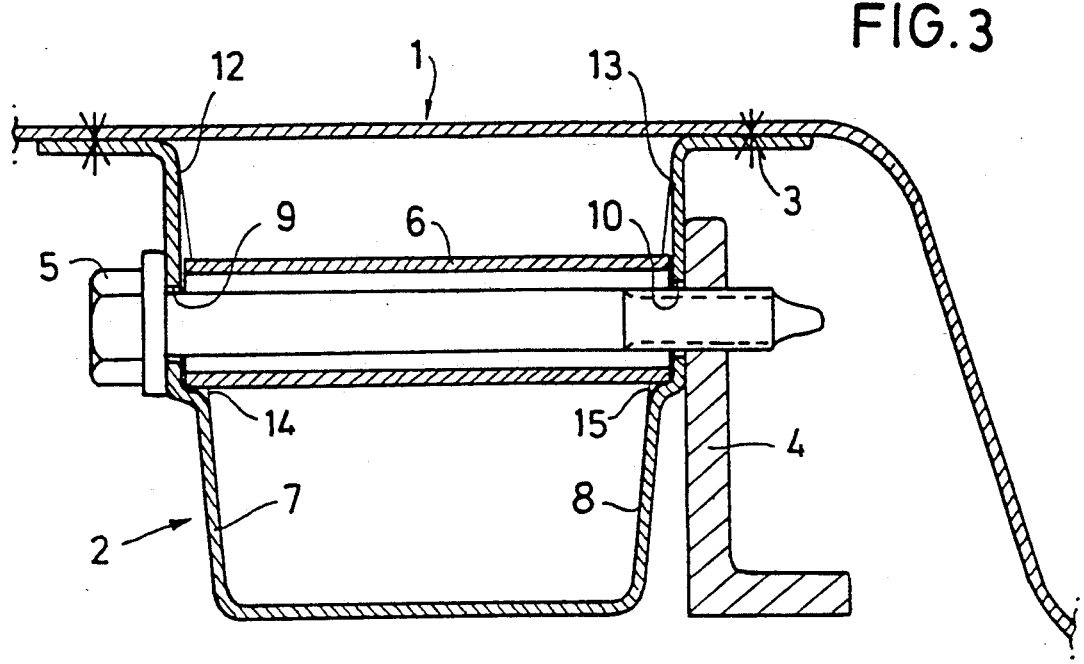
FIG. 3—a vertical cross section along line III—III of FIG. 1.
Figure 4:
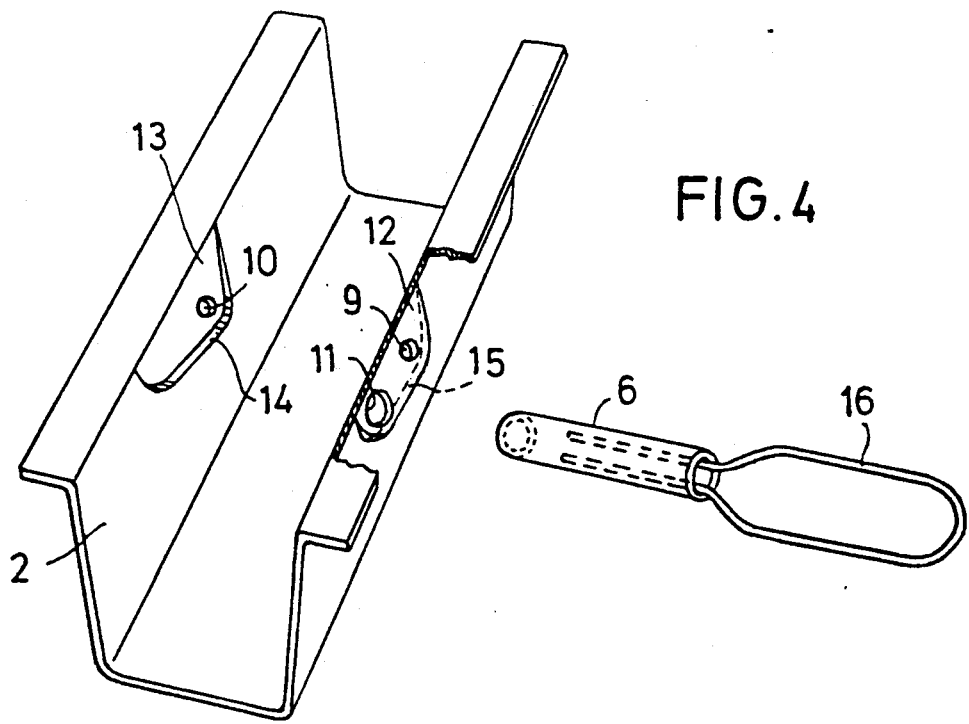
FIG. 4—a perspective view of the assembly process with the help of a simple assembly device.

Certain components, such as for example, a brace 4 for a trailer hitch, as shown in FIG. 3, are preferably mounted only after the body has been painted in the manufacturing plant or may alternatively be mounted after leaving the plant.

In order to ensure the optimum distribution of the loads to be absorbed by the hollow beam 2, a mounting bolt 5 extending transversely to the hollow beam 2 must be clamped against side walls 7 and 8, extending axially within a spacer 6, at least partially encompassing the mounting bolt 5. For this mounting arrangement to be effective, however, it is necessary for mounting holes 9 and 10 for the mounting bolt 5, to be smaller than the inner diameter of spacer sleeve 6 in order that the sleeve mounts in columnar fashion between side walls 7 and 8.

In order to be able to insert the spacer sleeve 6 inside the hollow beam 2, a larger access opening 11 must be provided through at least one side wall such as the side wall 7 of the hollow beam 2. The placement of spacer sleeve 6 for the good transfer of the loads to side walls 7 and 8 is not possible in the area registering with access hole 11.

The invention, therefore, proposes to provide means in the hollow beam 2, which allows attachment of the spacer 6 in the provided position, at least partially encompassed by the mounting bolt 5 while permitting a final position as shown in FIG. 3 wherein loads may be transferred between side walls 7 and 8.

In the illustrated preferred embodiment, these means are provided by indentations 12 and 13 which are added to the side walls 7 and 8 of beam 2. Lower edges 14 and 15 of the indentations 12, 13 form longitudinally slanted ramps, over which the spacer sleeve 6 is brought to its intended position, concentric to attachment holes 9 and 10 for receiving the bolt 5.

Advantageously, a simple assembly fixture device 16 may be used for the insertion of the spacer sleeve 6 inside the hollow beam 2, in the form of a simple wire strap, whereby it is ensured that, when inserting the spacer sleeve 6, the sleeve 6 lays securely on the two laterally spaced ramps 14 and 15, so that it can roll along their longitudinal slant to the prescribed position of the sleeve as shown at FIG. 3.

It will be appreciated by those skilled in the art, instead of indentations 12 and 13 longitudinally extending ramp surfaces formed on the side walls 7 and 8 for placement of the spacer sleeve can also be provided. It is also contemplated that the inner reinforcement plates which may be required inside the hollow beam can be arranged such that they can also act as a guide for the spacer sleeves to be inserted.

I claim:

1. A hollow beam for a motor vehicle body including a pair of laterally spaced side walls interconnected at vertically spaced portions thereof to define a closed cross-section, and having a mounting arrangement for mounting a component of the beam, comprising:

a mounting bolt;

a pair of axially aligned mounting holes, each formed through an opposite one of the side walls and having a diameter sized to receive the mounting bolt therethrough;

an elongated sleeve having an inner cross-section sized to receive the mounting bolt therein and an outer cross-section larger than the mounting hole diameter; and means defining an access hole through at least one of the side walls, having a diameter sized to receive the sleeve outer cross-section therethrough and positioned proximate the mounting holes whereby the sleeve is insertable through the access hole into the closed cross-section of the beam and thereupon positionable into alignment with the mounting holes for receiving the mounting bolt.

2. A hollow beam as defined in claim 1, and further comprising means defining a ramp within the closed cross-section of the beam extending between at least one access hole and the mounting hole.

3. A hollow beam as defined in claim 2, wherein the ramp defining means comprises indentations formed on the side walls.

4. A hollow beam as defined in claim 2, wherein the at least one access hole is positioned vertically above the mounting holes.

* * * * *